(12) United States Patent
Bontaz et al.

(10) Patent No.: US 7,883,621 B2
(45) Date of Patent: Feb. 8, 2011

(54) OIL BYPASS DEVICE, AND ENGINE FITTED WITH SUCH A DEVICE

(75) Inventors: Christophe Bontaz, Marignier (FR); Michael Bonvalot, Pringy (FR); Stephane Perotto, Ayze (FR)

(73) Assignee: Bontaz Centre, Marnaz (FR)

( * ) Notice: Subject to any disclaimer, the term of this patent is extended or adjusted under 35 U.S.C. 154(b) by 791 days.

(21) Appl. No.: 11/869,352

(22) Filed: Oct. 9, 2007

(65) Prior Publication Data

US 2008/0083664 A1    Apr. 10, 2008

(30) Foreign Application Priority Data

Oct. 9, 2006    (FR) .................................. 06 54170

(51) Int. Cl.
*B01D 27/10* (2006.01)
*B01D 35/14* (2006.01)
(52) U.S. Cl. ....................... 210/133; 210/130; 210/440; 137/599.14
(58) Field of Classification Search ................. 210/133, 210/167.02, 171, DIG. 17, 429; 137/599.14, 137/601.2, 509; 123/196 A
See application file for complete search history.

(56) References Cited

U.S. PATENT DOCUMENTS 2,894,630 A * 7/1959 Humbert, Jr. ............... 210/133

FOREIGN PATENT DOCUMENTS

| DE | 40 37 628 | 6/1992 |
| EP | 0 473 261 | 3/1994 |
| FR | 2 569 767 | 3/1986 |
| GB | 1 595 051 | 8/1981 |
| GB | 2 164 395 | 3/1986 |

OTHER PUBLICATIONS

French Search Report for Application FR 06 54170 With an English Langue Search Report Attached; Search Completed Jul. 6, 2007.

* cited by examiner

*Primary Examiner*—Duane Smith
*Assistant Examiner*—Paul J Durand
(74) *Attorney, Agent, or Firm*—RatnerPrestia

(57) ABSTRACT

According to the invention, the filter is fixed to the engine block by screwing it to an attached connecting sleeve. The connecting sleeve contains a bypass valve, in the form of a tubular piston sliding in a through-passage and pushed against an intermediate shoulder by a spring. By sliding, the piston opens or closes a radial passage establishing direct communication between the inlet passage and the through-passage of the device. If the filter element of the filter is clogged, the pressure rise in the inlet passage causes the piston to move and the radial passage to open to reduce the pressure rise and ensure a satisfactory flow of oil. This reduces pressure rises upstream of the filter and ensures sufficient lubrication of the engine even in the case of clogging of the filter.

6 Claims, 5 Drawing Sheets

OIL BYPASS DEVICE, AND ENGINE FITTED WITH SUCH A DEVICE

TECHNICAL FIELD OF THE INVENTION

The present invention concerns circuits for distributing oil in heat engines such as internal combustion engines.

Internal combustion engines comprise moving parts such as pistons, crankshafts, etc., which must be fed continuously with lubricating and/or cooling oil.

For this, engines include a pressurized oil supply device, taking oil from a sump in the lower portion of the engine, pressurizing the oil by means of a pump to feed it into a network for distributing oil to the moving parts of the engine, the oil then returning to the sump.

During operation, because of wear of the various moving parts and the oil, particles are found in suspension in the lubricating and cooling oil, and it is necessary to filter the oil to prevent the propagation of these particles, which can be abrasive, to the moving parts of the engine. A filter capable of blocking the particles in suspension is provided for this purpose, in the circuit between the pump and the oil distribution network.

These particles progressively clog the filter in operation, which causes a progressive increase in the head loss in the filter. This results in a progressive reduction of the oil pressure in the passages downstream of the filter, and a simultaneous reduction in the rate of flow of oil to the moving parts of the engine. The problem also arises when starting under wintry conditions. In this case, the high viscosity of the oil makes the resistance to flow of the filter much higher and the oil pressure downstream of the filter decreases. The reduction in the oil pressure downstream of the filter risks leading to the destruction of the engine if the lubrication of the moving parts of the engine becomes insufficient or if the cooling of the engine becomes insufficient. The increase in the head loss tends to increase the pressure upstream of the filter. This upstream pressure can become prohibitive, with the risk of breaking certain parts such as seals or the filter. Any such breaking of seals suddenly interrupts the lubrication of the engine and also leads to its virtually immediate destruction.

To avoid these problems, there has for a long time been provision for fitting the filters in the oil distribution circuit so that they are interchangeable. Periodically changing the filter in principle avoids it becoming clogged beyond a threshold that would cause either pipes to burst or insufficient lubrication. The filters are generally fitted interchangeably to the engine block by means of a connecting sleeve screwed into the end of an oil distribution passage in the engine block and having a threaded section onto which a threaded section of the filter is screwed.

The operation of changing the filters is left to the assessment and the good intentions of the user, however, and the risk therefore remains of leaving a filter in place for too long and it becoming excessively clogged.

The greatest risk is the excessive increase in pressure in the pipes upstream of the filter, in the case of excessive clogging of the filter. To reduce this risk, connecting a relief valve between the pipe upstream of the filter and the sump has already been envisaged. In the case of the upstream pressure exceeding a particular alarm threshold, the relief valve opens and conveys oil directly from the outlet of the pump to the sump, thereby reducing the pressure in the upstream pipe. However, it is clear that the quantity of oil that passes through the filter is then reduced commensurately, which accentuates the phenomenon of reduced lubrication and cooling of the moving parts of the engine, again with the risk of destruction of the engine.

To avoid this risk, fitting a bypass valve into the interchangeable filter directly, between the filter inlet and its outlet, has been proposed. The valve then bypasses the filter element of the filter. In the case of excessive clogging of the filter element, the valve opens and conveys oil directly from the filter inlet to its outlet. This assures conduction of a sufficient quantity of oil to lubricate the engine, which simultaneously reduces any pressure rise upstream of the filter.

However, there is then the problem that correct operation of the device necessitates always having available a filter provided with a bypass valve. On changing the filter, if the user fits a filter that is not provided with any such bypass valve, the safety function is then absent, and the risks associated with progressive excessive clogging of the filter are encountered again.

It has been proposed more recently to fit the bypass valve inside a connection interface disposed between the filter and the engine block. In this case, the connection interface includes an axial through-passage that conveys oil from the filter to an outlet passage in the engine block and contains the bypass valve and a bypass passage.

The oil bypass device, which provides the safety function of maintaining sufficient oil pressure in the engine and a safety function of reducing any pressure rise upstream of the filter, then works correctly whatever the filter that the user fits to the engine, whether that be a filter fitted with a bypass valve or a filter without any such bypass valve. As a result, the security functions of maintaining sufficient oil pressure in the engine and of reducing any pressure rise upstream of the filter no longer depend on the intentions or attention of the user.

Structures of the above type are described in the documents GB 2 164 395 A, DE 40 37 628 A, GB 1 595 051 A and EP 0 473 261 A. In all cases, the bypass valve comprises at least one closure part that selectively closes an orifice of the bypass pipe and can be moved along the longitudinal axis of the orifice, being urged toward the orifice by a return coil spring or a return leaf spring.

Clearly these known devices do not have the sufficient reliability that might be expected of a safety device. In particular, because of the particular conditions of use of the valves in the presence of a fluid that is charged with impurities and that must be filtered, risks of failure remain in the case of soiling of the closure part or the orifice, or in the case of the closure part adopting an off-center position as a result of deformation of the return leaf springs: the seal is then no longer provided, an uncontrolled leak occurs, and the filtering becomes insufficient. The defective seal is aggravated by the fact that even partial opening of a displacement valve of this type increases the area of the valve subjected to the high fluid pressure, and therefore is further conducive to its opening.

STATEMENT OF THE INVENTION

An object of the present invention is to design a safety device that assures improved reliability of operation, avoiding the risks of failure of the safety valve in the case of soiling, and avoiding the risks of failure by deformation of the return leaf springs.

To achieve the above and other objects, the invention proposes an oil bypass device, comprising a bypass valve in a bypass passage, the bypass valve being adapted to assume the open state in the presence of a differential pressure higher than a particular bypass valve triggering threshold, the oil bypass device being integrated into a connecting sleeve adapted to be fitted to an engine block and to receive an interchangeable engine oil circuit filter, the connecting sleeve having an axial through-passage for conveying oil from the filter to an outlet passage of the engine block and containing the bypass valve and the bypass passage, the bypass passage being adapted to bypass a filter element of the filter.

According to the invention, the connecting sleeve comprises:

- in the axial passage, an inlet bore, an outlet bore with a diameter less than the diameter of the inlet bore, and an intermediate shoulder connecting the inlet bore and the outlet bore,
- at least one radial passage establishing communication between the inlet bore and an inlet passage of the engine block,
- a tubular piston mounted so as to slide axially in the inlet bore and pushed against the intermediate shoulder by a return spring to close the radial passage,
- the tubular piston including, on an outlet section of its exterior surface, an external annular recess with a radial facet which, in a closure position, is in line with the radial passage of the connecting sleeve.

The valve structure with a tubular piston, which moves transversely relative to the longitudinal axis of the orifice, is much less sensitive to any blockage caused by accumulation of particles carried by the fluid to be filtered. This prevents sealing defects.

Moreover, the area of the piston on which the differential fluid pressure generates a driving force in its direction of movement is the only radial facet of the external annular recess, and its area is not modified by the total or partial closing of the valve. This results in a further reduction of any risk of sealing defects.

In practice, the connecting sleeve can comprise:

- a threaded fixing section, adapted to be screwed into a threaded end section of the outlet passage of the engine block,
- a threaded receiver section, adapted to have an axial threaded fixing section of the filter screwed into it,
- an intermediate abutment section, of greater diameter, abutting axially against a connecting face of the outlet passage of the engine block, and against which a connecting wall of the filter abuts around a central outlet orifice of the filter.

This reproduces the usual structure of the connecting sleeves of known filters, so that no modification to the filters themselves is necessary for the purposes of the invention.

Another aspect of the invention proposes an engine fitted with an oil bypass device as defined hereinabove and comprising:

- a sump receiving an oil reserve,
- a pump taking oil from the sump and sending it under pressure to the inlet of the filter via an inlet passage in the engine block,
- an outlet passage in the engine block for receiving the oil at the outlet of the filter and for conveying it via an oil distribution network to the moving parts of the engine, from which it is recovered and returned to the sump,
- the filter engaged over the connecting sleeve which is itself provided with an oil bypass device with a radial passage and a tubular piston sliding axially for selectively establishing communication between the inlet passage and the outlet passage if the differential pressure between the inlet and the outlet of the filter element of the filter exceeds a particular bypass valve triggering threshold.

The presence of the oil bypass device of the invention remains compatible with the presence of a relief valve between the inlet passage (at the output of the pump) and the sump. The relief valve operates if the oil pressure in the inlet passage exceeds a particular alarm threshold, and maintains the pressure substantially at that alarm threshold. In the oil bypass device of the invention, the bypass valve is preferably sized to convey a sufficient rate of flow of oil to lubricate the engine correctly if the oil pressure difference between the upstream and downstream sides of the filter is equal to the particular alarm threshold, i.e. in the case of blocking of the filter and triggering of the relief valve.

BRIEF DESCRIPTION OF THE DRAWINGS

Other objects, features and advantages of the present invention will emerge from the following description of particular embodiments, given with reference to the appended figures, in which.

DESCRIPTION OF PREFERRED EMBODIMENTS

Figure 1:
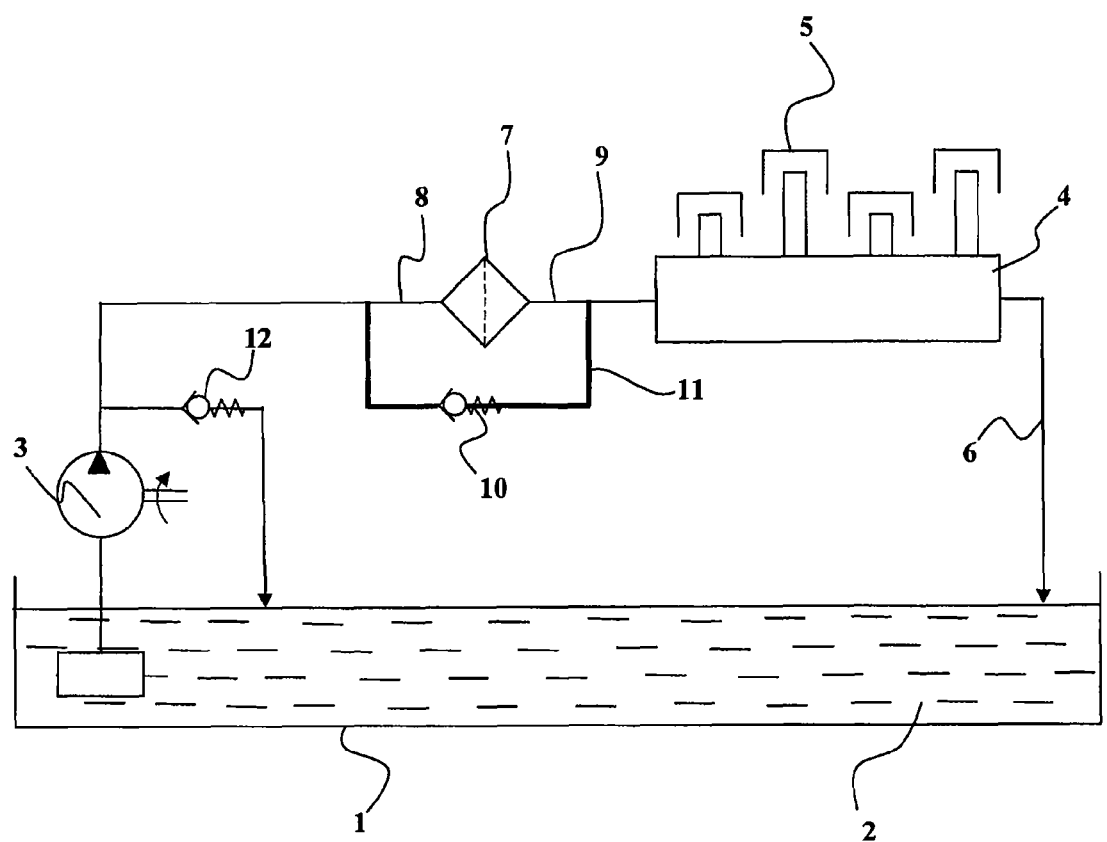
FIG. 1 shows diagrammatically the general structure of an engine lubricating and cooling circuit fitted with an oil bypass device of the present invention.

Consider first FIG. 1, which shows the general structure of an oil distribution circuit for cooling and lubricating moving parts of an engine.

The engine comprises, in the lower portion, a sump 1 that receives and contains an oil reserve 2. A pump 3 takes oil from the sump 1 and sends it under pressure in a distribution passage to an oil distribution network 4 that directs the oil to the moving parts such as the pistons 5 of the engine and the vital parts such as the crankshaft bearings of the engine. The oil then returns to the sump via a return passage 6.

In the distribution passage, a filter 7 is inserted between the pump 3 and the oil distribution network 4. The filter 7 is interchangeable, and thus is connected in a removable and sealed manner between an inlet passage 8 and an outlet passage 9 of the distribution pipe.

A bypass valve 10 is connected between the inlet passage 8 and the outlet passage 9 by a bypass passage 11. A relief valve 12 provides selective communication between the inlet passage 8 and the sump 1 if the pressure in the inlet passage 8 exceeds a particular alarm threshold.

The filter 7 is removably fitted to the engine block in the manner to be described with reference to the subsequent figures.

Figure 2:
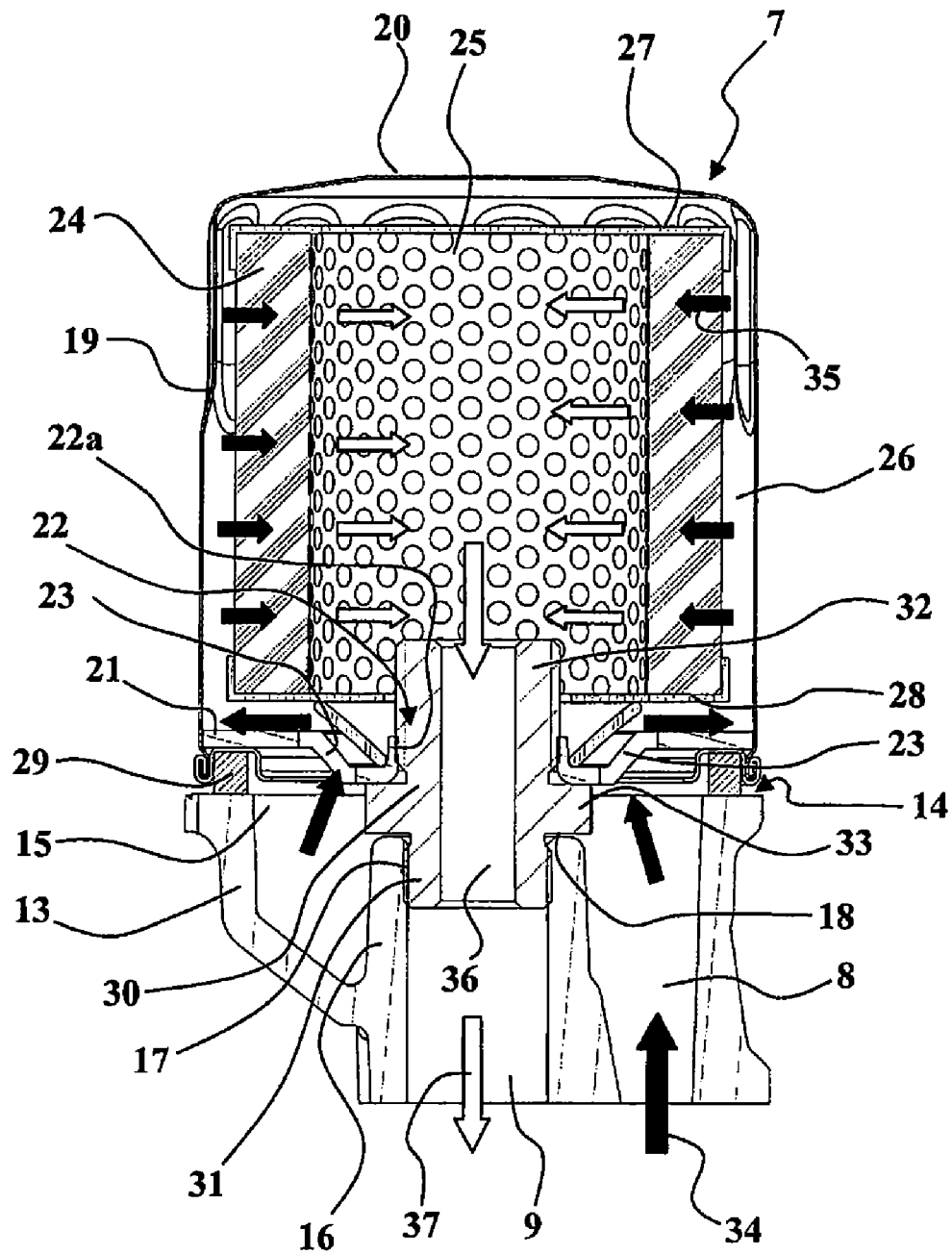
FIG. 2 is a view in longitudinal section of a known filter system comprising a filter connected to a sump by a threaded fixing sleeve.

FIG. 2 shows the usual structure of the interchangeable filters as connected to the engine block. In this figure, there is seen the engine block portion 13 that is to receive the filter 7 and that comprises the end sections of the inlet passage 8 and the outlet passage 9. The engine block 13 has a fixing face 14 provided with an annular chamber 15 into which the inlet passage 8 discharges. The outlet passage 9 terminates in a tubular cylindrical tip 16 projecting into the annular chamber 15 and terminating at a connecting face 18 set back from the fixing face 14. Inside the tubular cylindrical tip 16, the outlet passage 9 terminates in a threaded end section 17.

The filter 7 comprises an exterior tubular blind envelope 19, closed at its first end 20, and receiving at its second end a connecting and fixing wall 21 having a central outlet orifice 22 and one or more peripheral inlet orifices 23. The peripheral inlet orifices 23 face the annular chamber 15 of the inlet passage 8. The central outlet orifice 22 faces the outlet passage 9. Around the central outlet orifice 22, the connecting and fixing wall 21 includes an interior skirt forming an axial threaded fixing section 22a.

Inside the tubular blind envelope 19 is a tubular filter element 24 accommodated between a central space 25 and a peripheral space 26, the ends of the filter element 24 being closed by two sealed flanges 27 and 28.

An annular seal 29 is disposed between the connecting and fixing wall 21 and the fixing face 14, around the annular chamber 15.

The filter 7 is fixed and connected by a connecting sleeve 30 attached to the engine block 13. The connecting sleeve 30 comprises a threaded fixing section 31 adapted to be screwed and stuck into the threaded end section 17 of the tubular cylindrical tip 16 of the engine block 13.

At the opposite end, the connecting sleeve 30 includes a threaded receiver section 32 adapted to have the axial threaded fixing section 22a of the filter 7 screwed into it.

The connecting sleeve 30 further comprises an intermediate abutment section 33, of larger diameter than the threaded receiver section 32 and the threaded fixing section 31, and intended to abut axially against the connecting face 18 of the tubular cylindrical tip 16 of the engine block 13, against which the transverse connecting and fixing wall 21 abuts around the central outlet orifice 22 of the filter 7.

Finally, the connecting sleeve 30 includes an axial through-passage 36 for the passage of oil.

The axial dimension of the intermediate abutment section 33 is chosen to compress the seal 29 sufficiently when the filter 7 is in position on the engine block 13.

In operation, oil arrives via the inlet passage 8, as indicated by the arrow 34, and then penetrates into the peripheral space 26 of the filter 7 on passing through the peripheral inlet orifice 23, passes through the filter element 24 as indicated by the arrow 35, is recovered in the central space 25 and then passes through the through-passage 36 of the connecting sleeve 30 to escape into the outlet passage 9 as indicated by the arrow 37.

In this known structure, oil is always allowed to flow in the through-passage 36 of the connecting sleeve 30.

The filter 7 itself can contain a check valve or a bypass valve, which are not represented in the figure.

Figure 3:
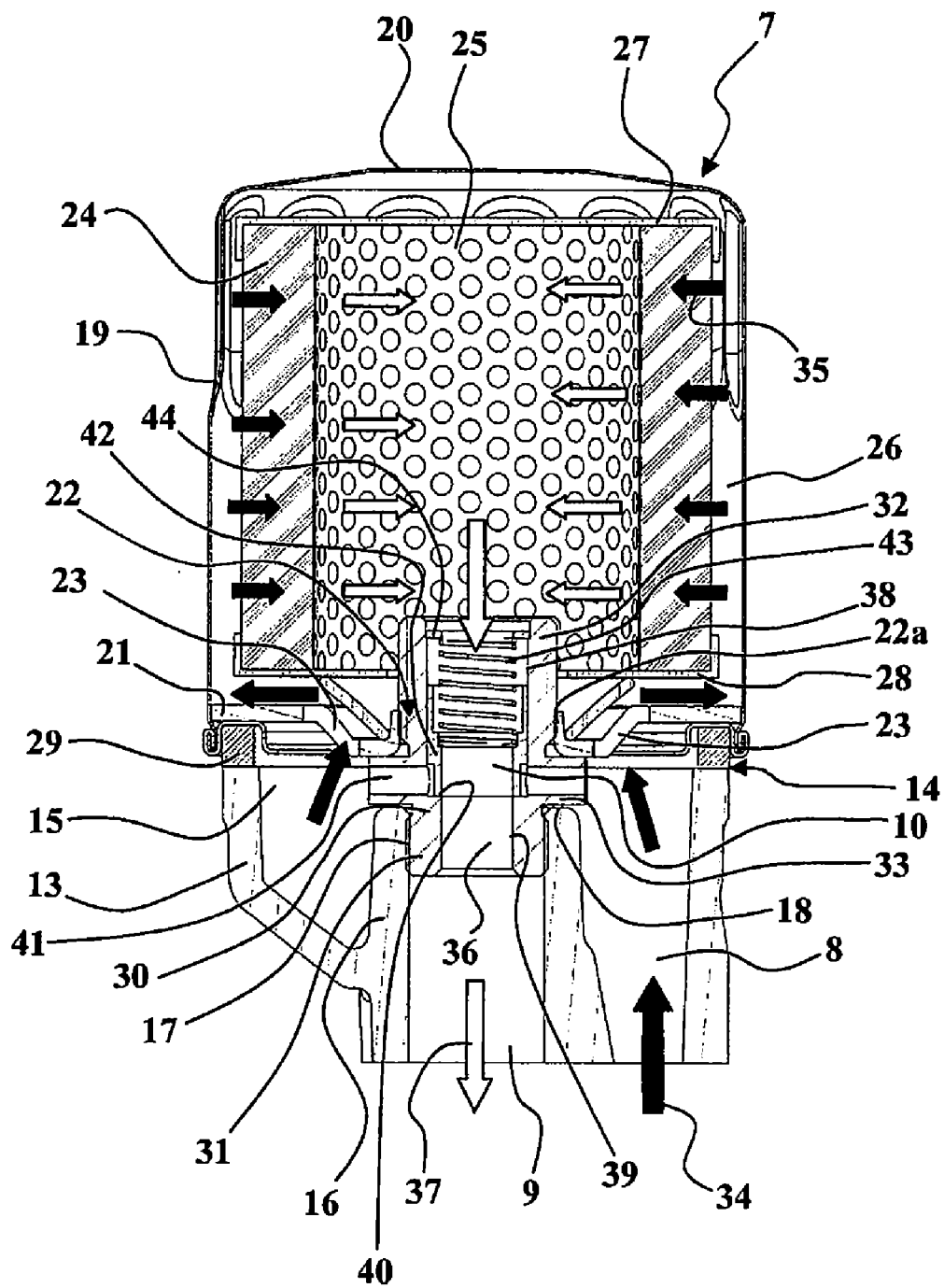
FIG. 3 shows, also in longitudinal section, a filtering system fitted with an oil bypass device according to one embodiment of the invention, with the bypass valve closed.
Figure 4:
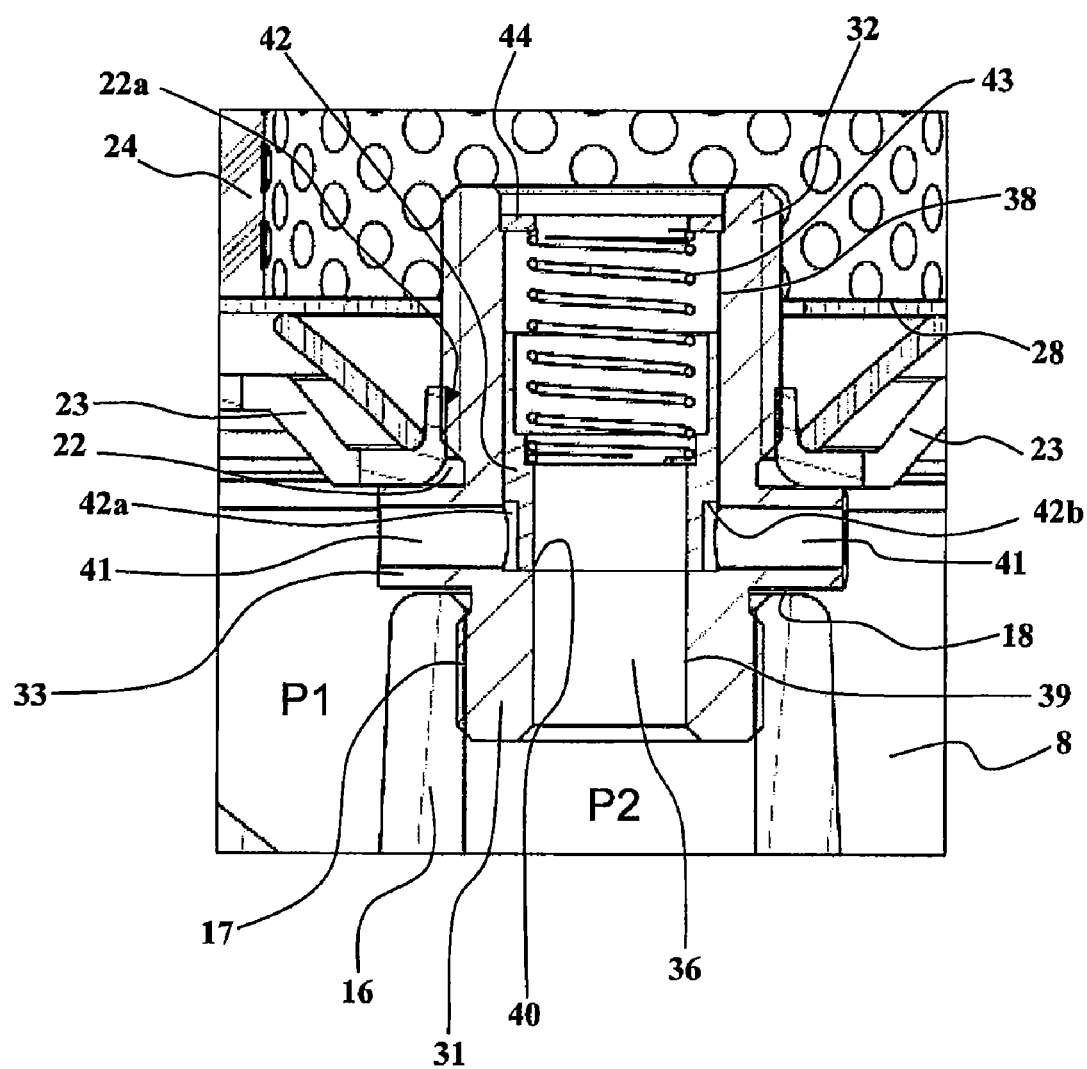
FIG. 4 is a partial view in section to a larger scale with the oil bypass device from FIG. 3 closed.
Figure 5:
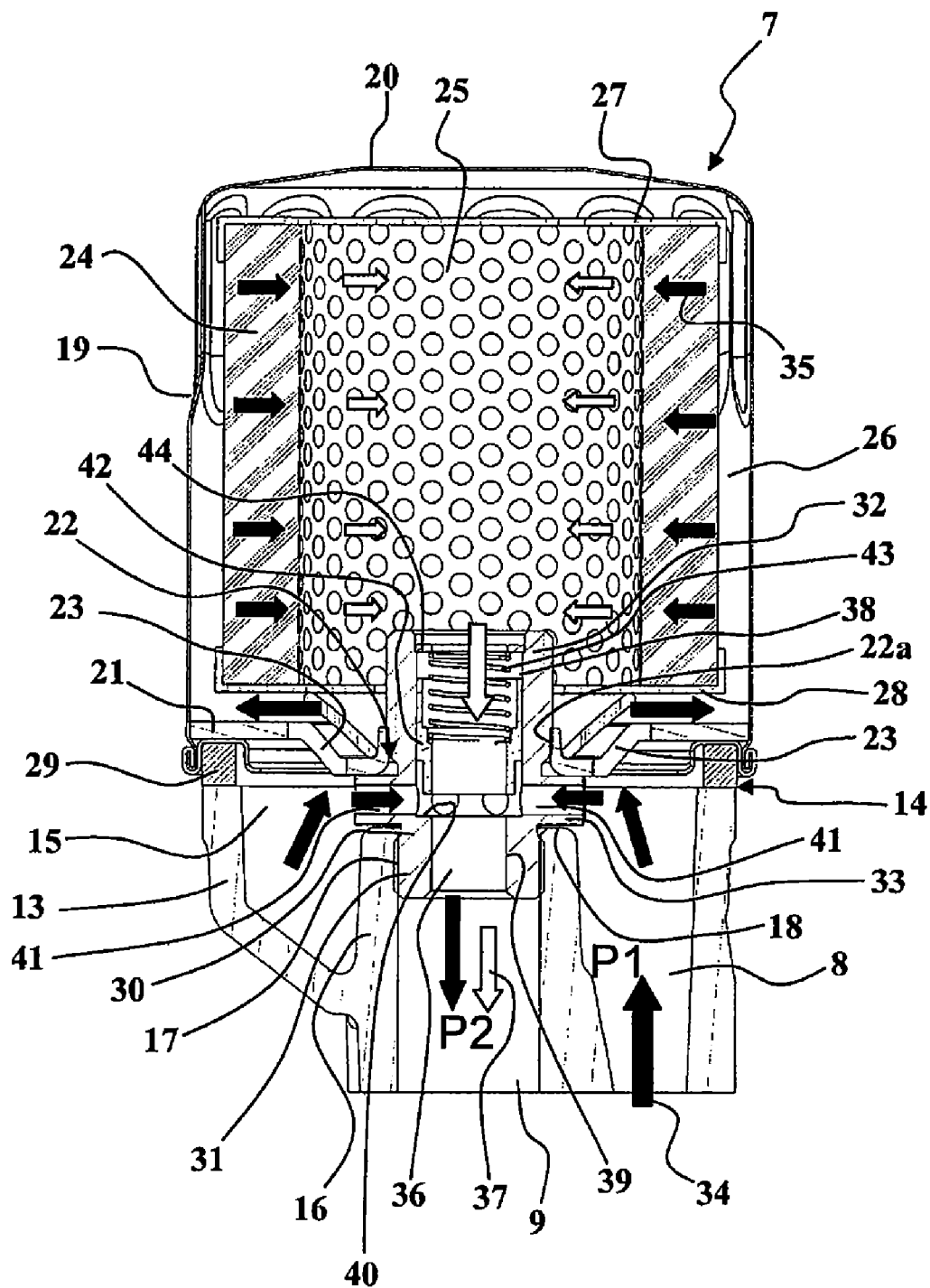
FIG. 5 shows the filter system from FIG. 3 in its bypass configuration.

Consider now FIGS. 3 to 5, which show the device according to the invention.

In this device, only the interior of the connecting sleeve 30 is modified. Thus all the other components of the known device from FIG. 2 are seen again, and those components are identified in FIGS. 3 to 5 with the same reference numbers. For this reason, these common components will not be described again.

In particular, the exterior shape of the connecting sleeve 30 from FIG. 3 is the same as the exterior shape of this sleeve in FIG. 2, in particular with regard to the dimensions of the threaded fixing section 31 and the threaded receiver section 32.

As in the known structure, the connecting sleeve 30 includes a through-passage 36 providing permanent communication between the central space 25 of the filter 7 and the outlet passage 9.

In the embodiment shown in FIGS. 3 to 5, the axial through-passage 36 of the connecting sleeve 30 comprises two successive sections, namely an inlet bore 38 and an outlet bore 39, which are coaxial with respect to each other. The outlet bore 39 has a diameter smaller than the diameter of the inlet bore 38. An intermediate shoulder 40 connects the inlet bore 38 to the outlet bore 39, and thus constitutes an annular seat oriented toward the filter 7.

At least one radial passage 41 is provided in the intermediate abutment section 33. The radial passage 41 provides communication between the inlet bore 38 of the through-passage 36 and the annular chamber 15 of the inlet passage 8.

A tubular piston 42 is mounted so as to slide axially in the inlet bore 38 and is pushed toward the engine block 13 by a return coil spring 43. The return coil spring 43 is a compression spring disposed between the tubular piston 42 and a fixing key 44 engaged in the inlet bore 38.

The tubular piston 42 slides with a small clearance in the inlet bore 38, so as to provide some degree of seal.

The spring 43 pushes the tubular piston 42 against the intermediate shoulder 40. In this position, as shown in FIG. 3, it blocks the radial passage 41, preventing direct flow of oil from the inlet passage 8 toward the outlet passage 9.

Consider now FIG. 5, showing the state of the device assuming serious clogging of the filter element 24 of the filter 7.

In this state, because of the clogging of the filter 7, the pressure P1 in the inlet passage 8 is much higher than the pressure P2 in the outlet passage 9.

If the pressure difference P1-P2 is greater than a bypass valve triggering threshold, the tubular piston 42 is pushed toward the filter 7 against the return force of the spring 43. In this position, the tubular piston 42 is moved away from the radial passage 41 and allows oil to flow directly from the inlet passage 8 toward the through-passage 36 and the outlet passage 9.

In this position, the direct flow of oil through the radial passage 41 causes a reduction in the pressure P1 in the inlet passage 8, providing the function of reducing any pressure rise, and enables sufficient oil to flow toward the outlet passage 9 to lubricate and cool the engine.

The tubular piston 42 and the return spring 43 in the connecting sleeve 30 thus constitute a bypass valve (valve 10 in FIG. 1), bypassing the filter 7 via the radial passage 41 and the outlet bore 39 which themselves constitute a bypass passage (bypass passage 11 in FIG. 1).

Consider now FIG. 4, which shows to a larger scale the elements of the bypass device according to the invention.

The tubular piston 42 includes, over an outlet section of its exterior surface, an external annular recess 42a limited axially by a facet 42b. In a closure position, the external annular recess 42a is in line with the radial passage 41 of the connecting sleeve 30. As a result, a pressure rise in the radial passage 41, coming from the inlet passage 8, produces a differential thrust on the facet 42b and therefore moves the tubular piston 42 against the return force exerted by the spring 43, i.e. upward in FIG. 4.

As represented in the figures, a plurality of passages like the radial passage 41 are preferably provided, distributed at the periphery of the through-passage 36, in order to ensure a sufficient rate of flow of oil to the engine in case of opening of the bypass valve, i.e. in case of blocking of the filter 7.

The force of the spring 43 will be chosen to cause the bypass valve 10 to open if the differential pressure P1-P2 reaches a particular threshold for triggering the bypass valve 10.

Generally, the bypass valve 10 will be open before the relief valve 12 opens (FIG. 1).

A coarse filter can be added upstream of the radial passages 41 in order to prevent the passage of excessively large particles that could damage the components of the engine. In one practical embodiment, this kind of filter could be a cylinder with a pierced peripheral wall, engaged axially over the intermediate abutment section 33 of the connecting sleeve 30 so as to be disposed at the inlet of each radial passage 41.

The present invention is not limited to the embodiments that have been described explicitly, and includes the various variations and generalizations thereof within the scope of the following claims.

The invention claimed is:

1. Oil bypass device, comprising a bypass valve in a bypass passage, the bypass valve being adapted to assume the open state in the presence of a differential pressure higher than a particular bypass valve triggering threshold, the oil bypass device being integrated into a connecting sleeve adapted to be fitted to an engine block and to receive an interchangeable engine oil circuit filter, the connecting sleeve having an axial through-passage for conveying oil from the filter to an outlet passage of the engine block and containing the bypass valve and the bypass passage, the bypass passage being adapted to bypass a filter element of the filter, wherein the connecting sleeve comprises:
in the axial passage, an inlet bore, an outlet bore with a diameter less than the diameter of the inlet bore, and an intermediate shoulder connecting the inlet bore and the outlet bore,
at least one radial passage establishing communication between the inlet bore and an inlet passage of the engine block,
a tubular piston mounted so as to slide axially in the inlet bore and pushed against the intermediate shoulder by a return spring to close the radial passage,
the tubular piston including, on an outlet section of its exterior surface, an external annular recess with a radial facet which, in a closure position, is in line with the radial passage of the connecting sleeve.

2. Device according to claim 1, characterized in that the connecting sleeve is shaped to be attached to the engine block.

3. Device according to claim 2, characterized in that the connecting sleeve comprises:
a threaded fixing section, adapted to be screwed into a threaded end section of the outlet passage of the engine block,
a threaded receiver section, adapted to have an axial threaded fixing section of the filter screwed into it,
an intermediate abutment section, of greater diameter, abutting axially against a connecting face of the outlet passage of the engine block, and against which a connecting wall of the filter abuts around a central outlet orifice of the filter.

4. Engine provided with an oil bypass device according to claim 1, comprising:
a sump receiving an oil reserve,
a pump taking oil from the sump and sending it under pressure to the inlet of the filter via an inlet passage in the engine block,
an outlet passage in the engine block for receiving the oil at the outlet of the filter and for conveying it via an oil distribution network to the moving parts of the engine, from which it is recovered and returned to the sump,
the filter engaged over the connecting sleeve which is itself provided with an oil bypass device for selectively establishing communication between the inlet passage and the outlet passage if the differential pressure between the inlet and the outlet of the filter element of the filter exceeds a particular bypass valve triggering threshold.

5. Engine according to claim 4, wherein the bypass valve is sized to conduct a sufficient rate of flow of oil for correct lubrication of the engine in the case of blocking of the filter.

6. Engine according to claim 4, further comprising a relief valve, connected between the inlet passage and the sump, for establishing communication between the inlet passage and the sump if the oil pressure in the inlet passage exceeds a particular alarm threshold.

* * * * *